United States Patent [19]

Montabert

[11] 4,165,788

[45] Aug. 28, 1979

[54] HYDRAULIC PERCUSSION APPARATUS

[76] Inventor: Roger Montabert, 19 avenue des Colonnes, Bron (Rhone), France

[21] Appl. No.: 849,248

[22] Filed: Nov. 7, 1977

[30] Foreign Application Priority Data

Nov. 8, 1976 [FR] France ................................ 76 34376

[51] Int. Cl.[2] .......................... B23Q 5/00; B25D 9/00

[52] U.S. Cl. ...................................... 173/17; 173/134; 173/DIG. 4; 91/303; 91/319; 91/321

[58] Field of Search ....................... 91/25, 26, 31, 220, 91/300, 303, 319, 321, 327, 328; 173/17, 126, 127, 134, DIG. 4

[56] References Cited

U.S. PATENT DOCUMENTS

| | | | |
|---|---|---|---|
| 1,846,804 | 2/1932 | Hansen | 173/17 |
| 2,781,026 | 2/1957 | Schlatter et al. | 91/220 X |
| 3,411,592 | 11/1968 | Montabert | 173/DIG. 4 |
| 3,664,435 | 5/1972 | Klessig | 173/17 |
| 3,691,907 | 9/1972 | Paschke | 91/321 |
| 3,766,830 | 10/1973 | Montabert | 91/300 X |
| 3,796,271 | 3/1974 | Amtsberg | 173/126 X |
| 3,803,983 | 4/1974 | Amtsberg | 91/300 X |

FOREIGN PATENT DOCUMENTS

| | | | |
|---|---|---|---|
| 2244769 | 3/1974 | Fed. Rep. of Germany | 173/134 |
| 133560 | 9/1929 | Switzerland | 91/303 |

*Primary Examiner*—Lawrence J. Staab
*Attorney, Agent, or Firm*—Karl F. Ross

[57] ABSTRACT

A hydraulic percussion or an impact apparatus for driving rock-breaking tools, drill bits and ramming or tamping tools comprises a body in which an end of the tool is received and a reciprocating mass formed as a piston which is axially displaceable in a cylinder. The cylinder is provided with a distributor member slidable above the piston and of the same diameter as the latter, the distributor being formed as a sleeve having a central portion engaging a collar of a plunger which extends into a piston and forms therewith a suction chamber. The plunger has an extension which is slidable in a bore of the body and is acted upon by the high-pressure fluid.

3 Claims, 14 Drawing Figures

HYDRAULIC PERCUSSION APPARATUS

FIELD OF THE INVENTION

The present invention relates to a percussion impact apparatus which is an improvement over that described in my U.S. Pat. No. 3,411,592. More particularly, the invention concerns a hydraulically actuated impact device intended to impart a succession of blows to the end of a tool.

BACKGROUND OF THE INVENTION

As described in my aforementioned patent, a hydraulic percussion apparatus comprises a body providing an inlet for the hydraulic pressure medium and an outlet therefor. The outlet forming part of a low-pressure hydraulic circuit while the inlet forms part of a high-pressure hydraulic circuit.

Within this body, there is reciprocatable a stepped piston which constitutes the striking or impact mass and is alternately driven toward and retracted from the end of a tool which is received in this body.

When the piston is driven toward the end of the tool, it strikes the latter, delivering an impact which can be used for a variety of purposes.

For example, the tool may be a chisel or other rock-breaking implement which can be used to break up pavement, concretes or mineral matter. The tool may also be a drill bit which is driven by the apparatus, a tamper or rammer adapted to compact a body of material, or an element forming a hammer to drive piling, posts or the like.

The apparatus may be manipulated by hand or mounted on a vehicle.

In principle, the high-pressure hydraulic circuit delivers the hydraulic medium under pressure to the large diameter end of the impact mass or piston to drive it against the tool and to a shoulder between the large diameter and small diameter portions of the piston to lift the piston away from the tool.

In order to control the reciprocation of the piston, there is provided within the cylinder above the piston, a distributor which is slidably mounted in the cylinder and alternately connects the chamber above the piston with the high pressure hydraulic medium circuit and with the low pressure hydraulic circuit or outlet to cause the reciprocation of the piston.

In the aforementioned patent this distributor is slidable above the piston and is caused to move rectilinearly alternately up and down, with a cadence which determines the impact frequency of the apparatus.

An essential part of this distributor, which has the configuration of a relatively massive sleeve, is an outwardly extending shoulder or collar which has a larger diameter than the remainder of the body of the distributor and than the diameter of the larger part of the striking mass or piston.

This collar or shoulder, at a given instant in the cycle, by the differential-piston effect, initiates the descent of the distributor.

While this construction has been found to represent a major advantage in impact-generating tools over the prior art described in the patent, it has been found to have a disadvantage. The speed of descent of the distributor is limited by hydrodynamic braking caused by the fact that the chamber connected to the low pressure side of the circuit is evacuated in a very brief time.

The shoulder, which has heretofore been considered indispensable to the functioning of the device, limits the speed of descent and produces a delayed opening of the flow passages so that the opening is not clean and the operation of the system is adversely affected.

In addition, the displacement of the distributor is necessarily limited by the presence of the shoulder which requires precise machining of two coaxial parts on the distributor having different diameters. This increases the cost of the apparatus and creates technological difficulties.

OBJECT OF THE INVENTION

It is the object of the present invention to provide an improved construction of a percussion apparatus of the type described and, more specifically, of the distributor and control mechanism for such an apparatus whereby the disadvantages enumerated above can be obviated.

SUMMARY OF THE INVENTION

I have now found that it is possible without limiting the function of the system described in the aforementioned patent and, indeed, with an increase in the versatility thereof, to do away with the aforementioned external shoulder and thereby provide a distributor whose external surface is of constant diameter over the full length thereof.

This not only facilitates or simplifies manufacture, but also permits the distributor to have a greater amplitude of axial displacement which may, if desired, extend the full length of the chamber left free by the descent of the piston. In addition the hydrodynamic greaking action is restricted. Opening and closing of the various passages is, with a modification of the distributor from that of an apparatus which may otherwise have the passages and striking piston of the aforementioned patent, made clear and sharper. This is achieved by providing in the upper end of the striking mass or piston a bore at the bottom of which is formed a suction chamber. Within this bore there is slidably mounted a piston plunger which thus is axially aligned with the striking piston reaching into the bore so that its lower end is subjected to the suction generated in this bore.

Externally of the bore, the plunger piston is provided with an outwardly extending shoulder or collar which is surmounted by an extension reaching upwardly into a further bore axially aligned with the first and formed in the body of the apparatus. The distributor, which has only a single external diameter in the region in which it is slidably engaged with the wall of the cylinder, is provided with a transverse partition slidable along the plunger piston and engageable by this shoulder, the partition being formed with a plurality of openings or windows outwardly of the plunger piston.

The bore into which the extension of the plunger passes is in communication, above the upper end of this plunger, with the high-pressure fluid circuit.

Downward movement of the distributor thus connects the chamber above the striking piston with the low-pressure source. As opposed to the system described in the aforementioned patent, however, this downward movement is not obtained by a resultant hydraulic force because of the differential piston effect, but rather by the mechanical entrainment of the shoulder of the plunger with the central part of the distributor. The openings surrounding this central part communicate directly and permanently between the two sides of the distributor so that hydrodynamic breaking is not a factor.

Because the external surface of the distributor sleeve is no longer stepped, machining is simplified and it is possible to ensure clean and complete opening of the liquid inlet under high pressure. The downward displacement of hthe distributor sleeve also is no longer limited except by the upper end of the striking piston.

An important feature of this invention is that is enables, without requiring any other elements, a supplemental function to be obtained which has the greatest of importance in certain application. Specifically, it permits the function of the apparatus automatically and instantaneously to be terminated upon loss of the tool, e.g. lodging of the tool in a body of rock so that the end of the tool recedes from the end of the cylinder.

The distributor need only be made somewhat shorter, in this case, so that an excessive downward movement of the striking piston will result in a corresponding downward entrainment of the distributor sleeve, to communicate simultaneously between the chamber above the piston and the inlet and outlet passages. Thus the hydraulic medium at high pressure is circulated directly through the chamber to the low-pressure circuit and fluid pressure build up to restrict the striking piston cannot occur. The striking piston and the distributor remain in their lower position until the striking piston is pressed upwardly by reinsertion of the tool. This system requires no modification of the passages shown in the aforementioned patent and permits the additional function to be obtained by merely a proper choice of the height of the distributor.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 11:
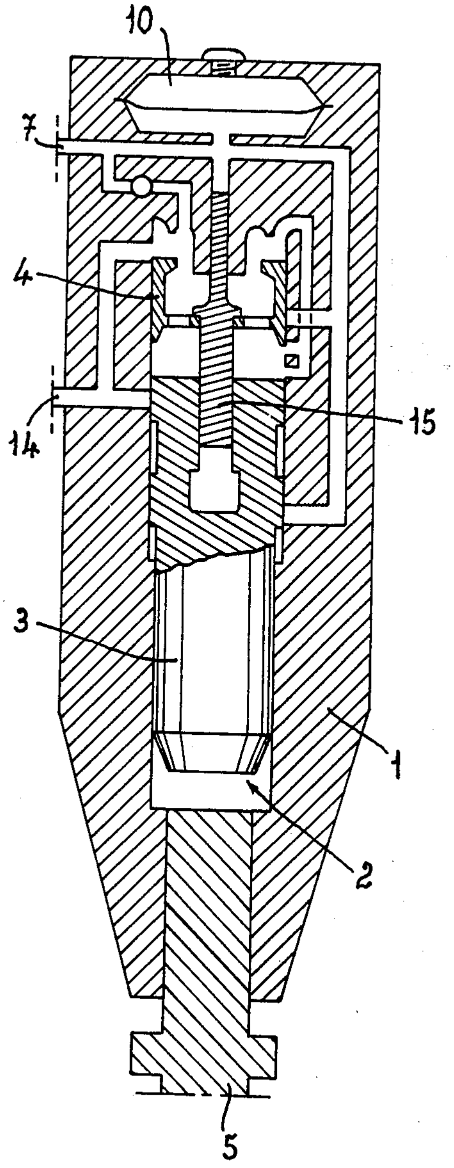
Figure 12:
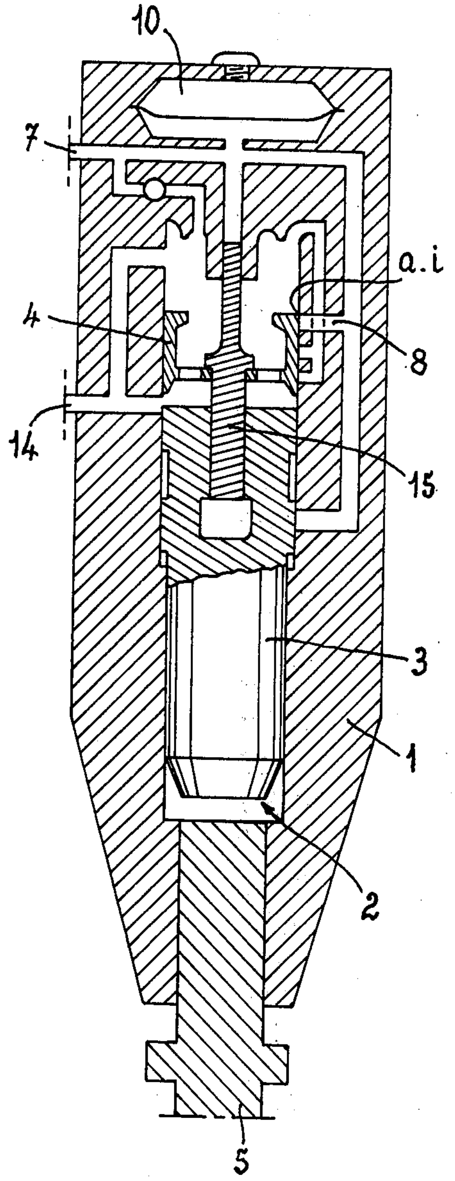
Figure 13:
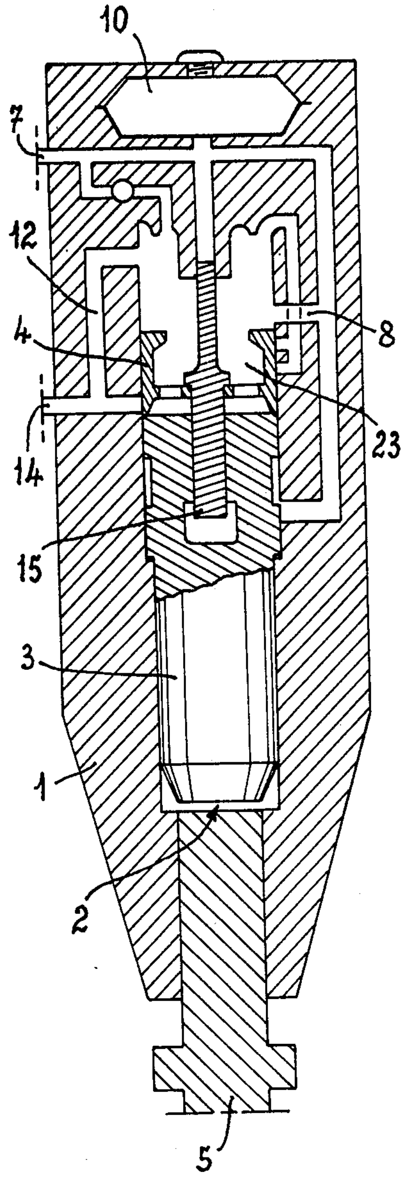

Referring first to FIG. 11, it will be apparent that the body 1 of the apparatus is provided with a cylinder 2 at the interior of which is slideably mounted an impact piston 3 and a tubular member 4 having the function of a pressure fluid distributor. At the side of the piston 3 opposite the distributor, there is provided a tool 5 only the shank of which, received within the body 1 of the apparatus, is shown.

The cylinder 2 is constituted by two bores of different diameters although these diameters are close to one another. The distributor 4 is slideably mounted in the bore of the larger diameter.

The piston 3 is likewise stepped and hence has two parts of different diameter, corresponding to the stepped diameters of the bores constituting the cylinder 2. The larger diameter portion of the piston 3 is formed with an annular groove 6.

The apparatus also comprises a hydraulic fluid inlet 7 at high pressure, connected to the interior cylinder tube by the passages 8 and 9. The high-pressure inlet 7 is, in addition, connected to a pressure accumulator of the membrane type, the membrane being represented at 11. The discharge of liquid at low pressure is effected by passages 12 and 13 communicating with the cylinder 2 below the inlet and interconnected. The common low pressure outlet 14 serves both of the passages 12 and 13.

The piston 3 has, in its larger diameter portion, a bored hole extending along its axis and in which is slideably mounted a piston in the form of a plunger 15. The bottom of this bore constitutes a vacuum chamber 16.

The part of the piston plunger 15 located outside the latter bore is formed with a shoulder 17 and has an extension 18 which is received within a bore 19 of the body 1 which is aligned with the axis of the piston 3 and communicates with the high-pressure circuit.

The distributor 4 comprises an annular central part 20 traversed by the piston plunger 15 and disposed below the shoulder 17 of the latter. This annular part is provided with holes 21 along its periphery, these holes communicating directly and permanently between the two sides of the distributor force. The upper end of the cylinder 2 communicates with a passage 22 which opens into the cylinder 2 by bores which lie substantially at the level of the lower portion of the distributor 4. Between the chamber 23 disposed above the piston 3 and the high-pressure circuit, there is provided a releasing or trigger element 24 which will be described subsequently.

Figure 1:
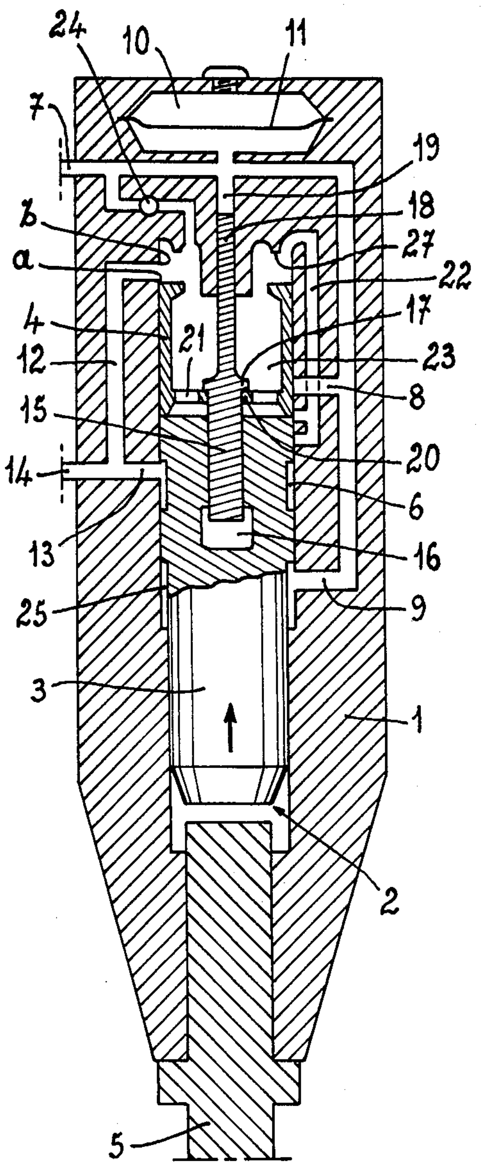
FIGS. 1-9 are longitudinal cross-sectional views diagrammatically illustrating a first embodiment of the apparatus according to the invention showing the various phases in normal operating cycle.

A complete cycle of the apparatus starts from the rest position thereof shown in FIG. 1. The cycle is as follows:

The hydraulic fluid at high pressure is supplied at 7 and fills the accumulator 10 to bias the membrane 11 upwardly. The pressure increase within the high-pressure passages 8 and 9 and in the annular chamber 25 below the large diameter portion of the piston 3 pushes the piston 3 and the distributor 4 upwardly, the distributor 4 being engaged by the upper end of the piston 3.

The fluid contained in chamber 23, located in the upper part of the cylinder 2, is discharged toward the low-pressure outlet 14 via the passage 12.

This phase continues until the upper flank a of the distributor 14 crosses the highest point b of the opening of the port by which the passage 12 communicates with chamber 23 and cylinder 2.

Figure 2:
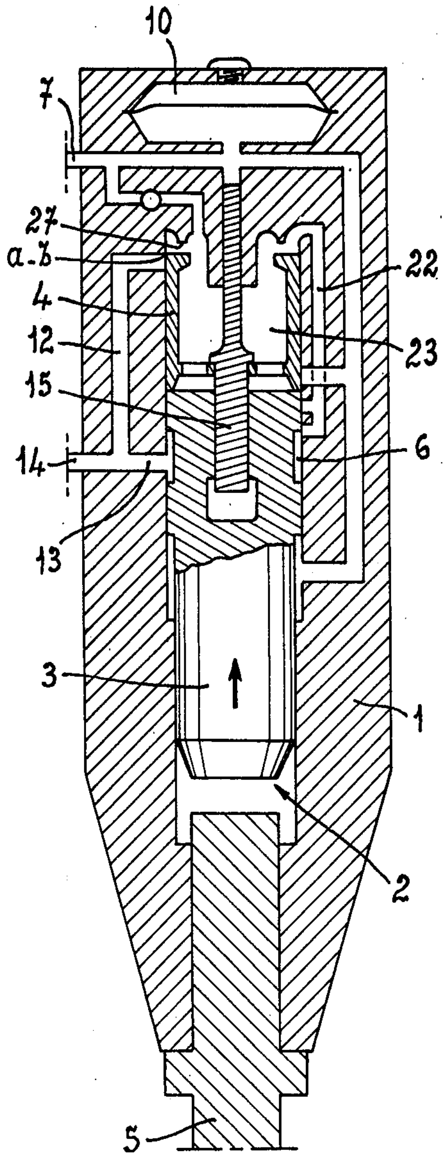

After this crossing, which corresponds to the postion shown in FIG. 2, the fluid contained in chamber 23 is discharged via the passage 22, the annular groove 6 of the impact piston 3 and the passage 14 running to the low-pressure outlet 14.

Figure 3:
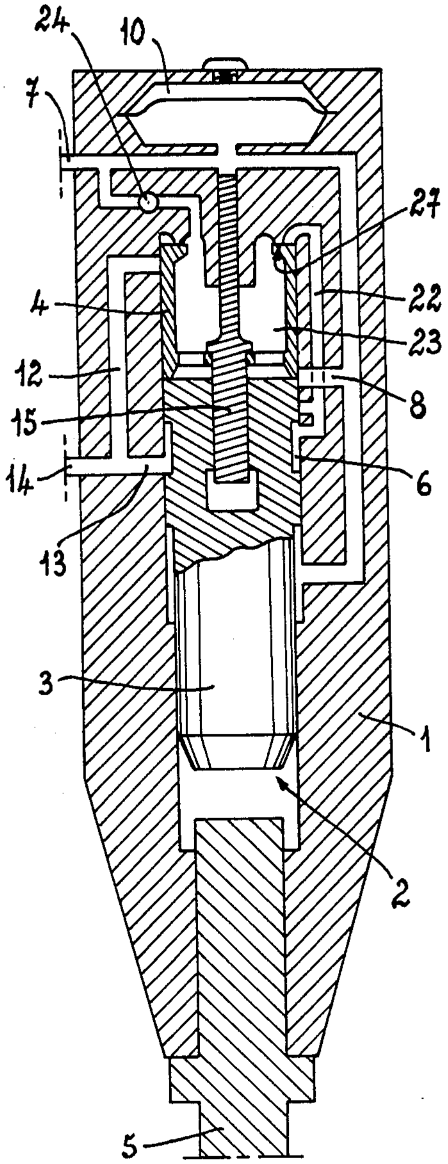

The ascending movement continues from the position shown in FIG. 2 to the position shown in FIG. 3 in which the upper phase of the distributor sleeve abuts against an annular stop 27 formed on the body 1 at the upper end of the cylinder 2. In this condition, the apparatus is said to be "armed" for the triggering of the impact stroke. The pressure within the chamber 23 is thus termed the minimum pressure for arming. However, the triggering is not instantaneous and the pressure continues to rise in the high-pressure circuit, thereby charging the accumulator 10 further (compare the positions of the membranes shown in FIGS. 2 and 3).

Figure 4:
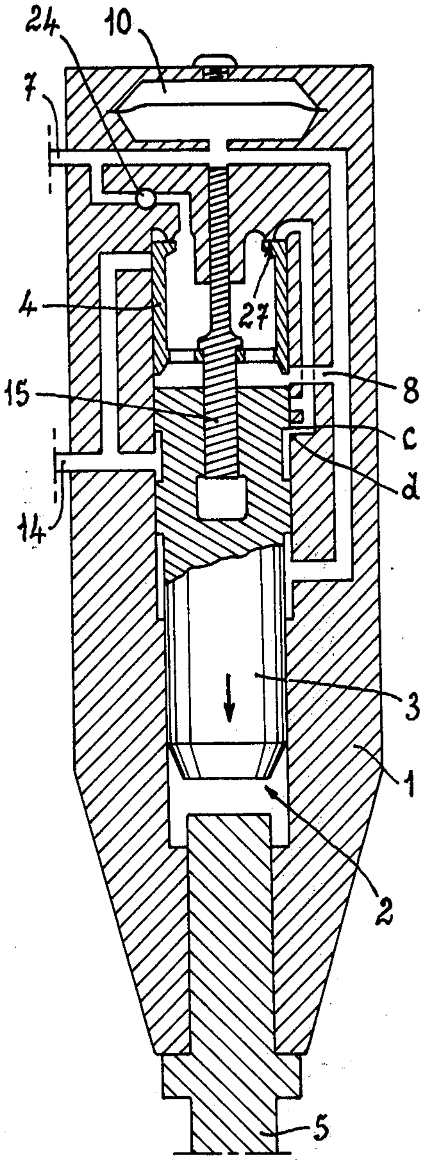

The actual triggering of the device is initiated by an increase of the pressure within the chamber 23 such that the resultant of the forces applied to the piston 3 changes in direction, i.e. from an upward force represented by the arrows in FIGS. 1 and 2 to the downward force represented by the arrow in FIG. 4.

This increase in pressure for the triggering of the impact stroke can be obtained by various triggering means which have symbolically been represented at 24 and can be of the type described in the aforementioned patent.

For example, if the high pressure fluid is fed at a permanent and calibrated rate, the pressure in chamber 23 is maintained, during the arming phase, in a pressure between the maximum high pressure level and the pressure which prevails in the low pressure network. The increase in pressure can be attained automatically by the restriction of the volume of chamber 23 brought about by engagement of the upper face of the distributor sleeve 4 and the abutment 27 of the body 1. In this case, once the threshold pressure is exceeded, the impact piston 3 will be driven downwardly without any manipulation of a control element.

Alternatively, there may be provided a certain degree of play between the extension 18 of the piston plunger and the wall of the bore 19 of the body 1 in which it is received. In this case, high pressure fluid can be bled into the chamber 23 through this clearance or play and again pressure buildup in chamber 23 will eventually exceed the threshold pressure. Here again no separate actuation of a control element is provided.

It is possible to provide, as the element 24, an automatic pressure control valve which opens when the pressure at the high pressure side of the network 7, etc. is approached by the pressure in chamber 23, e.g. at a low pressure differential across the valve. Here again, the chamber 23 is communicated automatically with the high pressure network when the impact piston 3 and the distributor 4 are in their armed positions shown in FIG. 3.

Finally, the triggering can be effected by a valve operated from the exterior and also represented by element 24. When the valve 24 is opened, the full pressure of the high-pressure network is applied to the chamber 23 and downward displacement of the piston 3 is initiated.

The piston 3 is thus driven downwardly (see the arrow in FIG. 4) to open communication between the high pressure passage 8 and the chamber 23 fully, the resulting increase in flow of the high pressure fluid accelerating the downward displacement of the piston 3 toward the top of the tool received in the body 1.

The accumulator 10 supplies the additional volume of fluid at high pressure which is necessary for this rapid displacement.

The distributor sleeve 4 meanwhile rests against the abutment 27 since the resultant hydraulic force applied to the oppositely effective faces of this distributor are directed upwardly. In other words, the sum of the downwardly effective forces resulting from the application of the high pressure to the small area of distributor 4 lying inwardly of the abutment 27 is smaller than the sum of the upwardly effective forces which apply to the annular lower edge of the distributor over the full diameter thereof. Similarly, the differential action upon the piston plunger 15 maintains the latter in its upper position until sufficient suction develops within the chamber 16 to cause this plunger to follow the movement of the striker piston 3.

Figure 5:
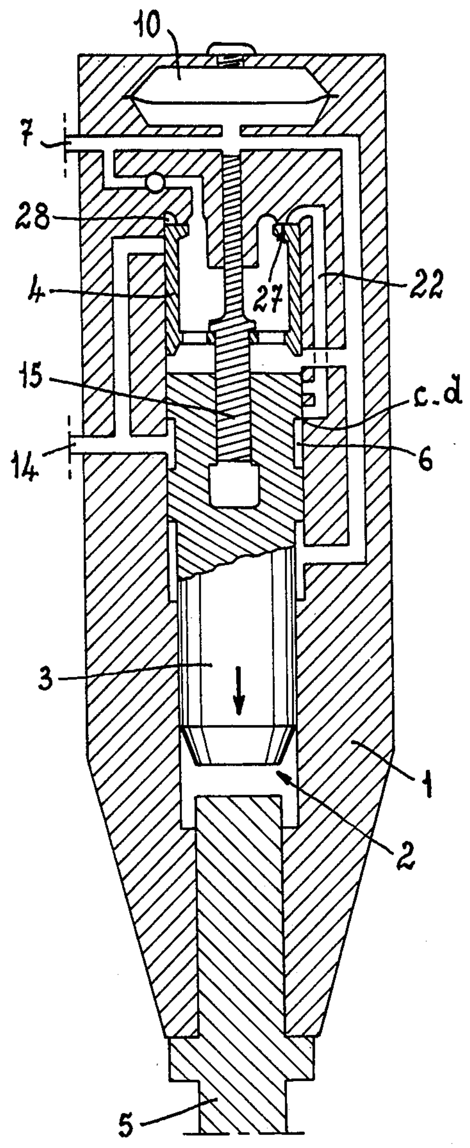

The piston 3 continues its descent until the upper flank c of the annular groove 6 crosses, as shown in FIG. 5, the low point d of the orifice at which the passage 22 opens into cylinder 2. The annular chamber 28 above the distributor 4, disposed outwardly of the abutment 27, is isolated by the distributor 4 from the chamber 23 and remains at low pressure at the outlet 14.

Figure 6:
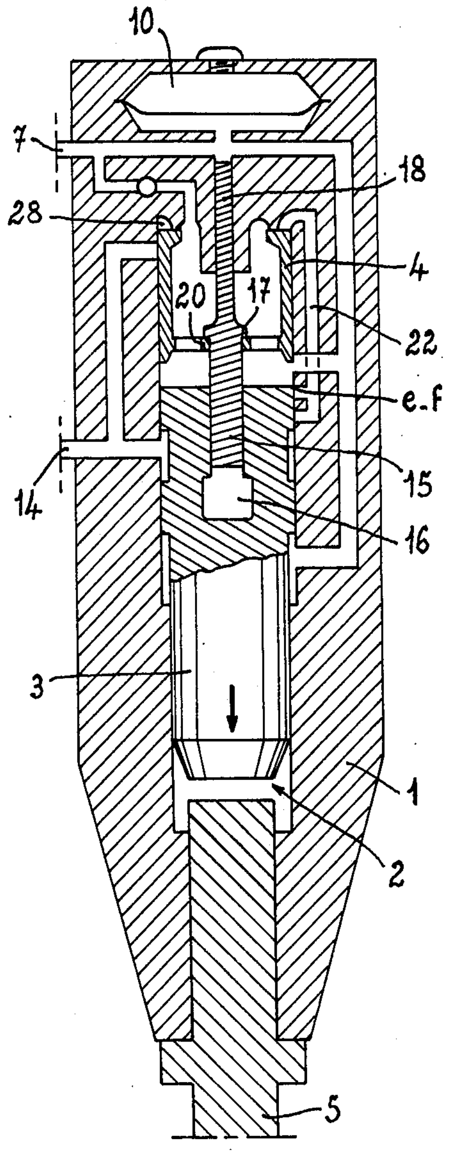

As the piston 3 descends further, its upper flank e crosses, as has been shown in FIG. 6, the high point f of the orifice whereby the passage 22 opens into the cylinder 2. Annular chamber 28 is thus communicated with the high pressure network via the passage 22.

The hydraulic forces applied to the oppositely effective phases of distributor 4 are equilibrated and the resultant force asserted upon the distributor 4 changes in direction. The preponderant force is that which is applied via the shoulder 17 to the piston plunger 15, to the extension 28 thereof and to the bottom of this plunger by the increased suction in chamber 16. Distributor 4 is thus drawn downwardly.

Figure 7:
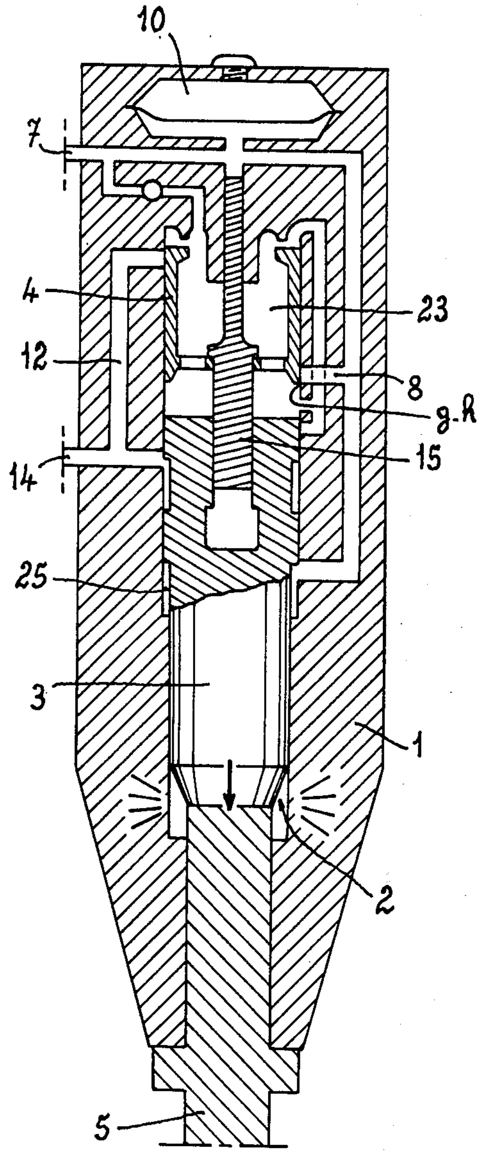

As can be seen from FIG. 7, the lower flank g of the distributor 4 crosses the low point h of an orifice at which the passage 28 opens into the cylinder 2. The admission of high pressure fluid into chamber 23 is interrupted and piston 3 continues its movement, by inertia, until it engages the tool 5.

Figure 8:
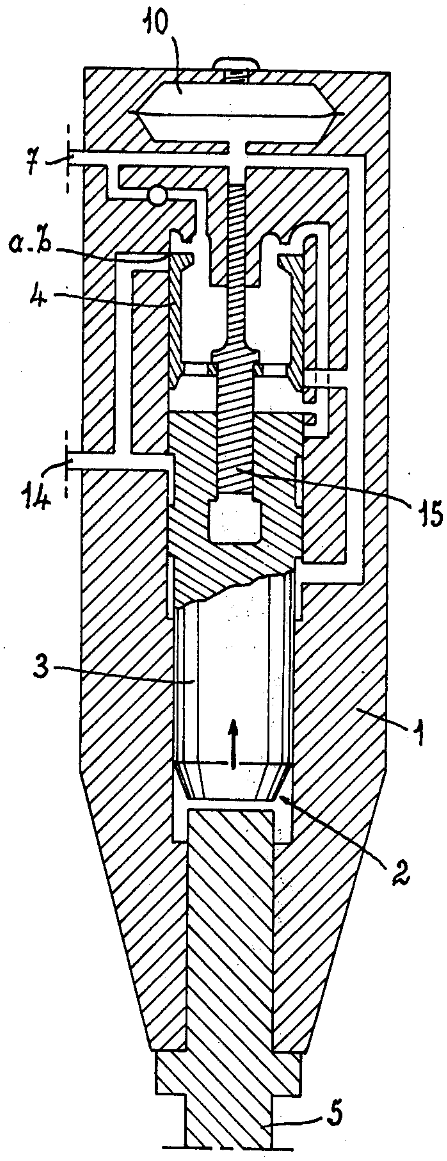

The distributor 4 continues in its downward movement (FIG. 8) until its upper flank a crosses the high point b of the orifice communicating between the passage 12 and chamber 23. Chamber 23 is thus caused to communicate with the low pressure circuit by the passage 12. The piston 3 is displaced upwardly after having struck the tool under the force of the fluid in chamber 28.

Figure 9:
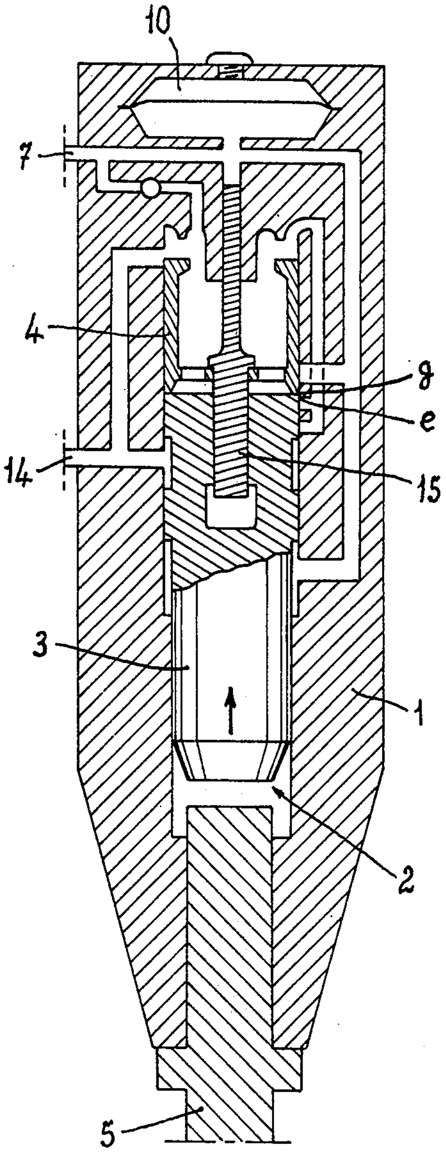

The continuing movement, to the position shown in FIG. 9, carries the upper flank e of piston 3 to the lower level g of the distributor 4 and entrains the latter upwardly. The cycle is completed and a new cycle identical to the first can be begun.

In the embodiment illustrated in FIGS. 10 through 13, the axial length or vertical height of the distributor 4 is reduced, which does not change the normal functioning of the apparatus as described with respect to a single cycle previously; however, it does afford a supplemental function which is the instantaneous and automatic stopping of the reciprocation of the piston in the event the tool 5 is lost, e.g. recedes from the cylinder.

Figure 10:
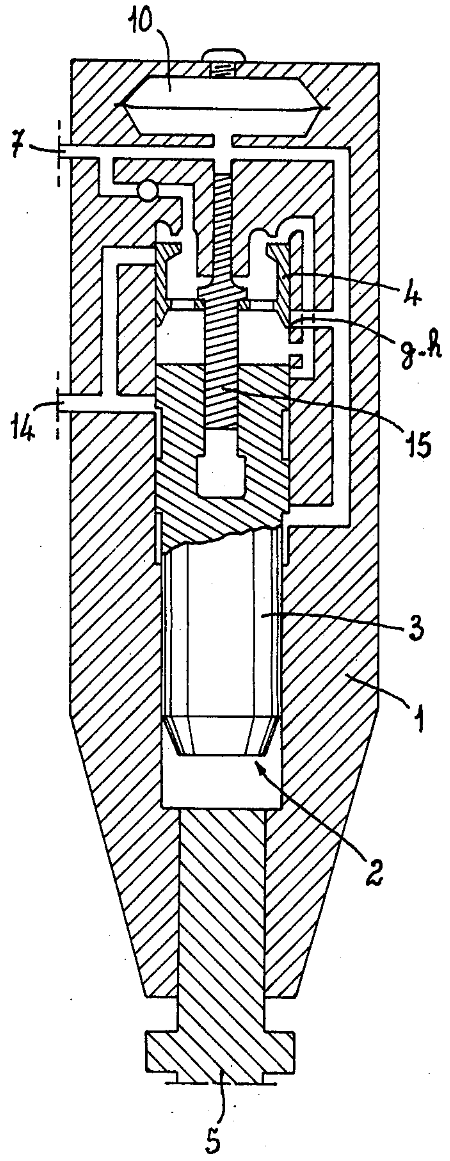
FIGS. 10-13 are longitudinal cross-sectional views diagrammatically illustrating another embodiment of the apparatus according to the invention showing the supplementary function of instantaneously stopping the apparatus automatically in the case of sudden loss of the tool.

In the position shown in FIG. 10, which corresponds to FIG. 7, and hence that at which the piston 3 ought to have struck the tool, the piston 3 cannot encounter the tool.

Thus the piston 3 continues its downward movement as shown in FIG. 11.

The distributor 4, which has no outwardly extending shoulder to arrest its displacement, is entrained downwardly by the plunger 15. During this downward movement, the distributor 4 unblocks the orifice by which the passage 8 communicates with the cylinder because of the reduced height or length mentioned previously, in the position shown in FIG. 2. In this position, the upper flank a of the distributor crosses the high point i of the latter orifice. The passage 8 of the high pressure circuit is thus brought into communication with the low pressure circuit, the accumulator 10 discharges entirely, the piston 3 and the distributor 4 continue to descent as whown in FIG. 3, and the apparatus ceases to function because the fluid circulates freely from the passage 8 through the chamber 23 and the passage 24 without engendering any further displacement of the piston.

To restore the functioning of the apparatus, it is merely necessary to reinsert the tool 5 which pushes the piston 3 and the distributor upwardly until the communication between passage 8 and chamber 23 is again blocked. The pressure within the accumulator 10 can then build up normally and the regular operating cycle as described can be repeated.

Figure 14:
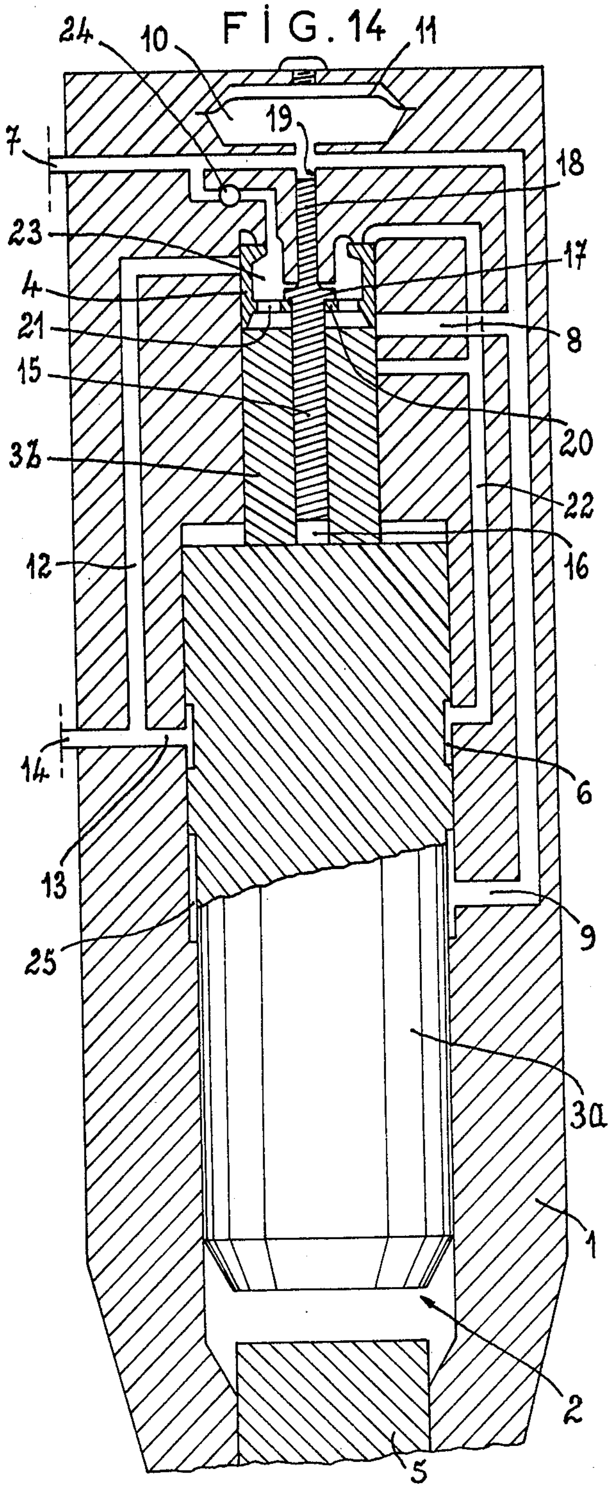
FIG. 14 is a longitudinal cross-sectional view diagrammatically illustrating another embodiment of the invention.

In the embodiment shown in FIG. 14, essentially the same principle is used but the apparatus is distinguished from the embodiments previously described by the fact that the piston is formed in two parts, one of large diameter *3a* and constituting the initial mass for impact against the tool while the other piston *3b* is of small diameter and may be equal to that of the distributor 4. This small piston part is intended to entrain the distributor and is formed with a bore for the piston plunger 15. In this construction, the diameter of the imact mass *3a* can be substantially greater than that of the distributor 4. The two parts *3a* and *3b* are continuously in contact with one another and the remainder of the apparatus functions are identical to those described.

The apparatus of the present invention is adapted to provide a succession of impacts upon a tool such as a drill, spike, pick or the like in order to break up material such as concrete, rock or other minerals or to carry out any work requiring impacts. Such work can include riveting, hammering, ramming or tamping, pile-driving or the like.

I claim:

1. An hydraulic impact apparatus comprising:

a body formed with a cylinder and adapted to receive a tool at an end of said cylinder;

a striking piston reciprocable in said cylinder toward and away from said tool whereby said striking piston impacts against said tool;

a high-pressure hydraulic network formed in said body and adapted to communicate with a chamber formed in said cylinder at an end thereof opposite the end at which said striking piston impacts against said tool;

a low-pressure hydraulic network formed in said body and adapted to communicate with said chamber;

a distributor reciprocable in said chamber and controlling a hydraulic fluid flow between said networks and said chamber to enable pressurization of said chamber in one extreme position of said distributor whereby said striking piston is propelled towards said tool, and depressurization of said chamber upon movement of said distributor away from said extreme position, said distributor being formed with a constant outer diameter engageable with the wall of said cylinder and slidable therealong and with a central part formed with a plurality of openings communicating between opposite sides of said distributor; and a plunger having a piston end, a shoulder and an extension, said striking piston being formed with a bore receiving said piston end of said plunger and forming a suction compartment therewith, said shoulder being engageable with said central part of said distributor upon displacement of said striking piston toward said tool, said body being provided with a further bore slidably receiving said extension and communicating with said high-pressure network, said body being formed with a hydraulic pressure accumulator communicating with said high-pressure network, said high-pressure network including a first passage opening into said cylinder at a location spaced from the end thereof opposite that at which said tool is received, said distributor comprising a sleeve engageable with said body at the last-mentioned end of said cylinder corresponding to said extreme position of said distributor whereby said first passage opens into said cylinder below said distributor, said striking piston being stepped and having a shoulder between steps thereof, said high-pressure network including a second passage opening into said cylinder beneath the shoulder formed between said steps, said low-pressure network including a passage communicating with said cylinder and blocked by said sleeve in in said extreme position, said sleeve blocking said first of said high-pressure network by the entrainment of said distributor with said shoulder of said plunger, said cylinder having a constant inner diameter along the portions thereof along which said sleeve and the larger diameter step of the striking piston slide.

2. The apparatus defined in claim 1 wherein said distributor is dimensioned, upon entrainment by said striking piston on the displacement thereof in the direction of said tool beyond a predetermined point, to connect both said networks with said chamber, thereby terminating reciprocation of said striking piston.

3. The apparatus defined in claim 1 wherein said piston has two parts including one of large diameter constituting a striking mass engageable with said tool and another of small diameter formed with said suction compartment.

* * * * *